No. 891,903. PATENTED JUNE 30, 1908.
F. W. BRADY.
FUEL FEED SYSTEM FOR INTERNAL COMBUSTION ENGINES.
APPLICATION FILED APR. 14, 1906.
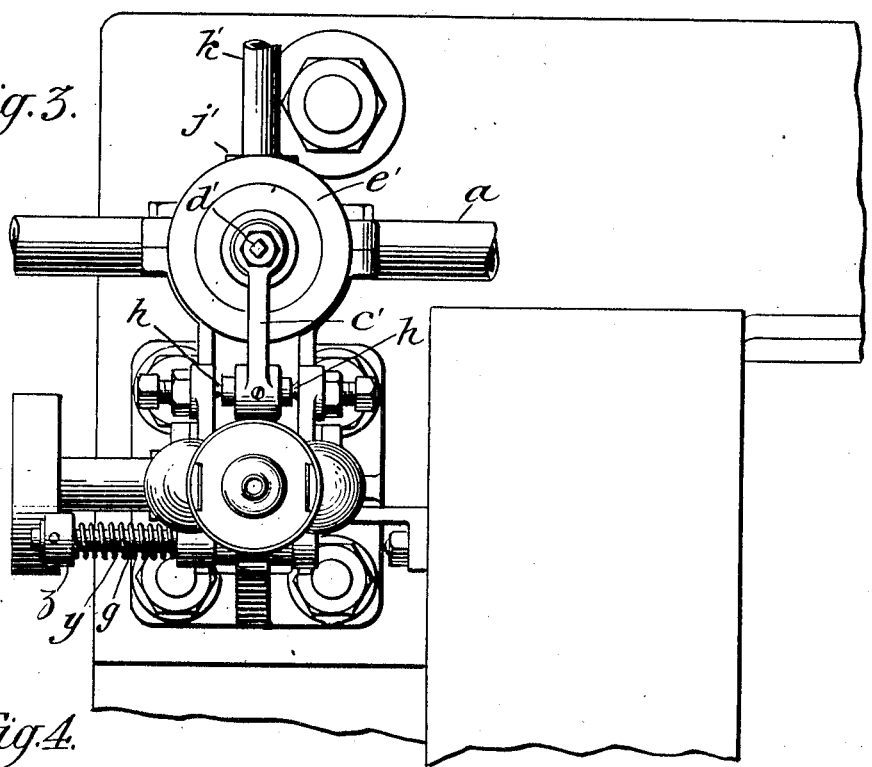
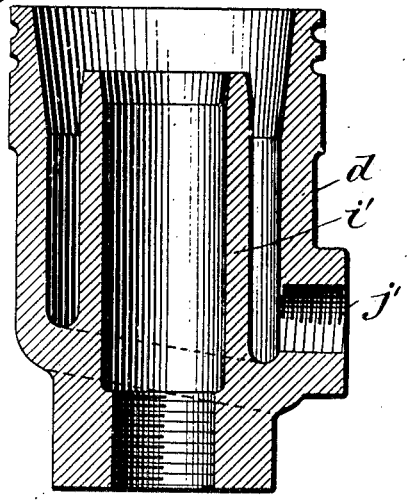
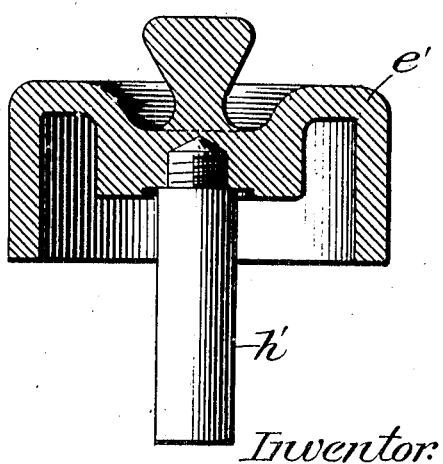

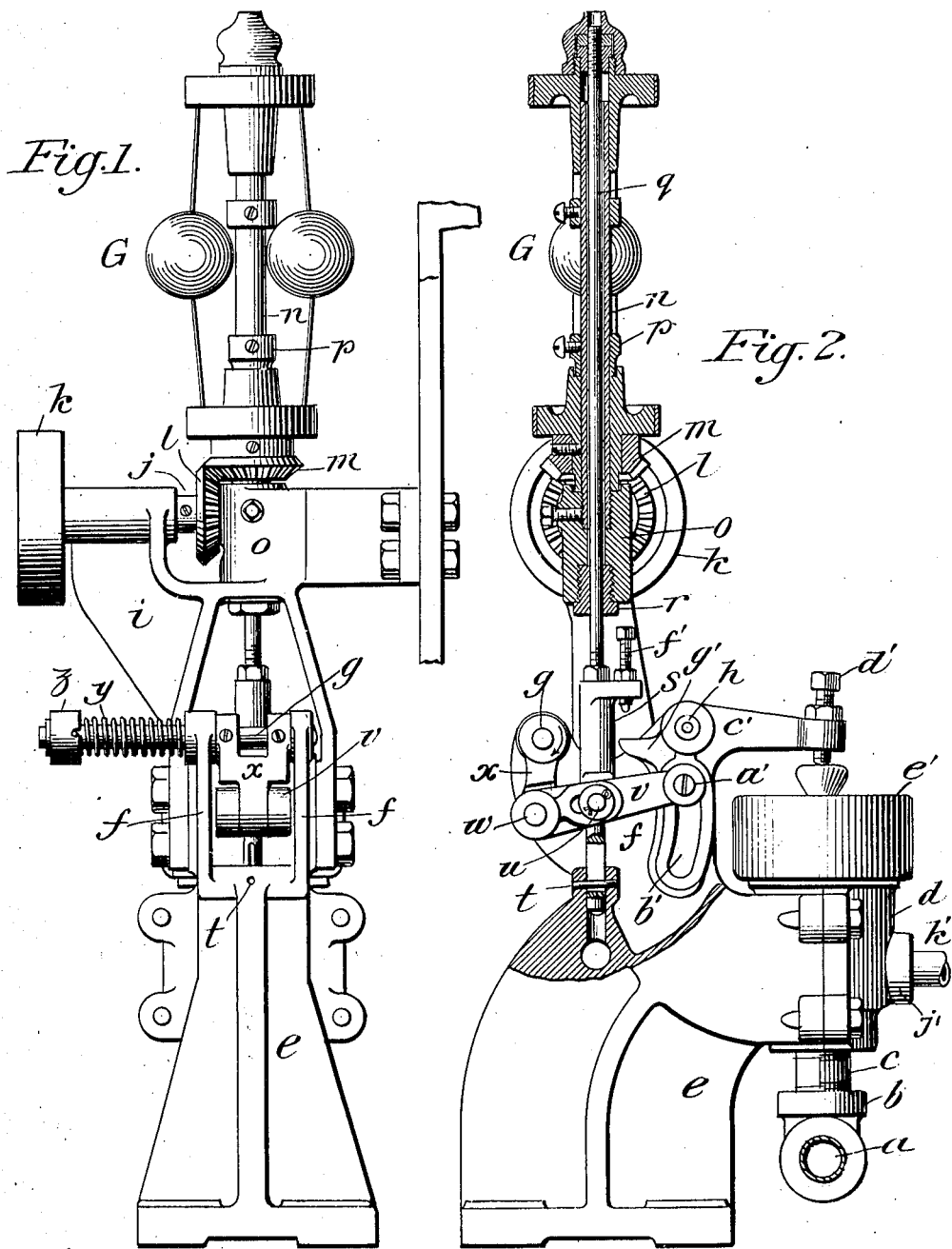

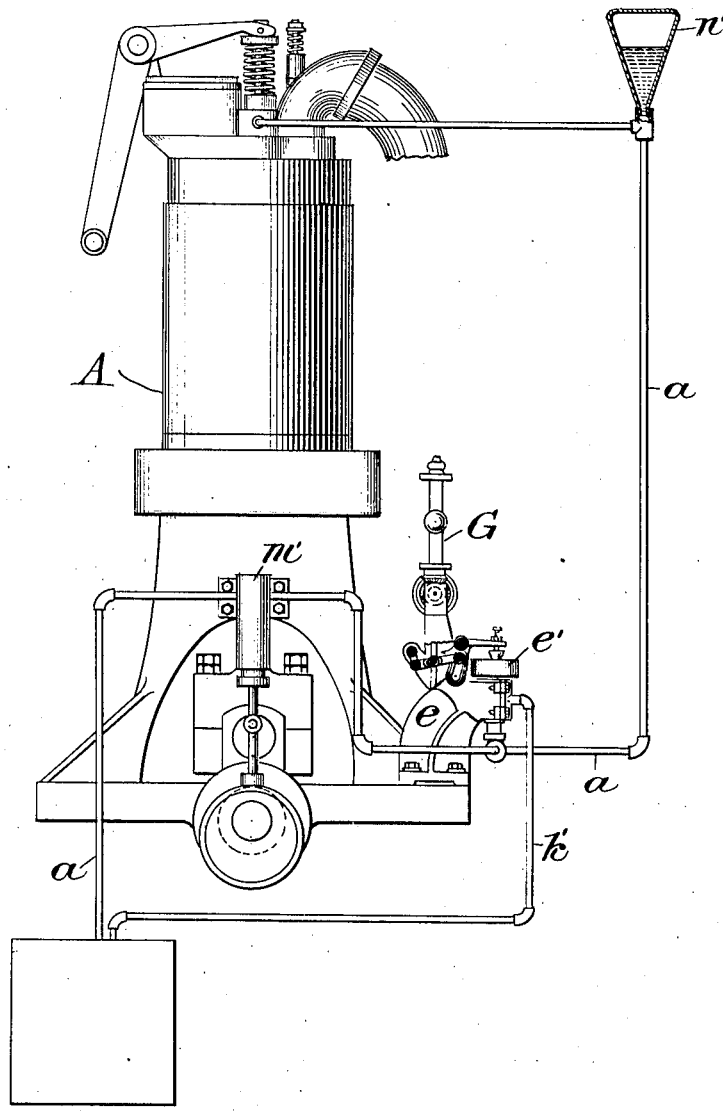

UNITED STATES PATENT OFFICE.

FRANCIS W. BRADY, OF ENGLEWOOD, NEW JERSEY.

FUEL-FEED SYSTEM FOR INTERNAL-COMBUSTION ENGINES.

No. 891,903.  Specification of Letters Patent.  Patented June 30, 1908.

Application filed April 14, 1906. Serial No. 311,768.

*To all whom it may concern:*

Be it known that I, FRANCIS W. BRADY, a citizen of the United States, residing at Englewood, county of Bergen, State of New Jersey, have invented certain new and useful Improvements in Fuel - Feed Systems for Internal - Combustion Engines; and I do hereby declare the following to be a full, clear, and exact description of the invention, such as will enable others skilled in the art to which it appertains to make and use the same.

My improvements relate to systems of fuel feed for internal combustion engines, in which the fuel is fed to the combustion chamber, or to the vaporizer or carbureter under pressure which increases with the speed of the engine. An example of such a system is one in which a hydro-carbon oil is fed to the engine cylinder, or to the vaporizer or carbureter from a tank supported above the level of the feed opening and in which the liquid hydro-carbon is pumped to the elevated reservoir by a pump driven from the main shaft of the engine.

Other examples will suggest themselves to those skilled in the art.

By my improvements I secure an accurate control of the pressure under which the fuel is fed and a consequent close regulation of the amount of fuel fed on each stroke of the engine and furthermore, the parts are so constructed and arranged that as the speed of the engine increases the pressure on the fuel will be allowed to increase, thus giving a greater velocity of feed to the fuel and thereby insuring a feed of the proper amount of fuel in the shorter time during which the feed port is opened, as the speed of the engine increases. The parts are preferably so arranged that this increase of velocity of fuel feed will maintain the amount of fuel fed for each charge constant, as the speed of the engine increases. By this arrangement I secure the maximum efficiency for fuel consumption throughout the arrange of speeds at which it is intended to run. I provide furthermore means for allowing the pressure on the fuel feed to decrease when the desired maximum speed of engine is reached, whereby the explosive mixture in the engine is starved and the tendency to overreach the desired maximum speed is opposed.

My improvements will be understood from a reading of the following description of the form in which I prefer to embody them, reference being had to the accompanying drawings.

In the drawings, Figure 1 is a rear elevation of an apparatus in which my improvements are embodied; Fig. 2 is a side elevation looking at the right of Fig. 1, and partly in section; Fig. 3 is a top plan view of the same, Figs. 4 and 5 are sectional views of the weighted pressure regulating relief valve, Fig. 6 shows in elevation an engine equipped with my improved system of fuel feed.

Referring to Figs. 1, 2 and 3, $a$ designates the fuel feed pipe in a pressure feed system. Into this feed pipe is connected a T section $b$. From the third opening in the T section, a pipe $c$ extends vertically into the bottom of the weighted pressure regulating relief valve $d$. This valve $d$ is provided with lugs by which it is bolted to a casting $e$, which is secured to the frame of the engine. The casting $e$ is provided with a pair of upwardly extending arms $f$, in which the shaft $g$ is journaled and the bearings $h$ for the lever $c'$ are supported. Bolted to this casting $e$ and preferably also to the frame of the engine is a casting $i$, which is provided with a bearing for the shaft $j$ carrying a pulley $k$, by which it may be driven from the main shaft of the engine. This shaft $j$ carries at its inner end a beveled gear $l$ meshing with a corresponding gear $m$ connected to the ball governor G. The gear $m$ and the lower collar of the ball governor are rotatable on the sleeve $n$ supported by a tubular enlargement $o$ on the casting $i$, and are prevented from vertical movement by the collar $p$, which is fastened by a set screw to the sleeve $n$. The upper collar of the ball governor carries the rod $q$, which passes through the sleeve $n$ and the tubular enlargement $o$, as shown in Fig. 2. Into the lower end of the tubular enlargement $o$ is screwed the collar $r$, by which the rod $q$ is guided. This rod $q$ carries a head $s$ in the lower end of which is a slot through which a pin $t$ in a bearing on the casting $e$ passes. A flattened portion of the head $s$ is embraced by the link $v$ and a pin $u$ carrying appropriate washers, passes through a slot in the link $v$ and the flattened portion of the head $s$. The link $v$ also embraces the lower end of an arm $x$ and is pivotally connected thereto by a pin $w$. The arm $x$ is rigidly secured to the shaft $g$. On the shaft $g$ and outside of the arm $f$ is a torsion spring $y$, one end of which is fastened to the adjacent arm $f$ and the other end of which is fastened to a collar $z$ on the shaft $g$. The tendency of this torsion spring is to rotate the shaft $g$ in a clockwise direction, as viewed in Fig. 2, and with it the arm $x$. The other end of the link $v$ embraces the two-armed lever $c'$ and carries a pin $a'$ fitting into a curved slot $b'$ in said lever $c'$. The curvature of this slot $b'$ corresponds with the circumference of a circle drawn about $w$ as a center. The two armed lever $c'$ is supported by the cone bearings $h$ and carries at its outer end a pin $d'$ adapted to engage with and press down upon the weighted cap $e'$ of the valve $d$ thus creating a counter-pressure on the relief valve. This pin $d'$ is screw-threaded and, therefore, adjustable. Carried by a lug on the plunger $s$ is a pin $f'$ which is also screw-threaded and adjustable, and which is adapted to engage with a projection $g'$ on the lever $c'$ when the head $s$ moves down to a sufficient extent.

Referring to Figs. 4 and 5, it will be seen that the cap $e'$ of the valve $d$ is of a solid construction and carries a weight $h'$. This cap is adapted to fit on the top of the valve $d$ with its weight $h'$ within the inner chamber of the valve $d$, and the depressed portion of the cap $e'$ is adapted to seat itself upon the top of the annular partition $i'$ within the valve casing. The interior chamber of the valve $d$ communicates with the fuel feed pipe through the pipe $c$ and the exterior chamber of the valve $d$ has an outlet $j'$ into which is tapped a pipe $k'$ communicating with the reservoir, from which the fuel is pumped to the pressure tank.

In Fig. 6 the above described apparatus is shown in place in a pressure fuel feed system attached to an internal combustion engine. In this figure the engine is indicated at A and the governor G with the weighted valve $e'$ are shown secured to the frame of the engine by the bracket $e$. The pump $m'$ driven by an eccentric on the main shaft of the engine, draws oil from the supply tank through the pipe $a$, which leads through the T with which the relief valve communicates. The pipe $a$ leads the oil into an air chamber $n'$ which is closed at the top. This chamber serves as a reservoir and maintains the pressure by the compression and expansion of the air. From this air chamber the oil flows into the engine when the feed valve is open. The overflow from the relief valve $e'$ flows through the pipe $k'$ back into the supply tank.

The operation of the part is as follows: At the starting of the engine the pressure in the feed system is maintained at the desired point by the dead weight of the cap $e'$ on the valve $d$, and by the counter-pressure of the pin $d'$ on this cap, which counter-pressure is caused by the torsion spring $y$, which tends to turn the arm $x$ in a clockwise direction, as viewed in Fig. 2, pulling back the link $v$ and pressing the pin $a'$ against the inner surface of the slot $b'$ on the lever $c'$ thus creating a turning moment on the lever $c'$ against the pressure of the system. It will be understood that in this condition of the parts if the turning moment due to the pressure of the feed system on the under face of the cap $e'$ is greater than the turning moment due to the weight of the cap $e'$ and the counter pressure of the pin $d'$ thereon, the cap $e'$ will be lifted, allowing the fuel to escape over the top of the partition $i'$ in the valve $d$ and back into the storage reservoir, thus reducing the pressure on the feed system to the point where the cap $e'$ seats itself. As the speed of the engine increases, the balls of the ball governor separate and press down the rod $q$ and the head $s$, thus moving the pin $a'$ on the link $v$ down the slot $b'$ in the lever $c'$ giving a greater leverage of the arm $x$ on the lever $c'$, thus increasing the counter-pressure on the pressure regulating relief valve. This increased counter-pressure on the pressure regulating relief valve raises the point at which the pressure on the feed system will be relieved by that valve. In consequence of this increase of pressure on the feed system, the velocity of fuel feed will be increased and the amount of fuel fed on each stroke will remain constant up to the desired maximum speed. The pin $f'$ on the head $s$ is so set that it will contact with the projection $g'$ on the lever $c'$ when this desired maximum speed has been reached. Any increase in speed above this point will result in a further depression of the head $s$ and the pin $f'$, with the result that the pin $f'$ throws back the lever $c'$ and lifts the pin $d'$ from the cap $e'$, thus relieving the pressure on the feed system and thereby starving the mixture. The starving of the mixture, of course, results in a decrease of the speed of the engine to the desired point.

It will be understood that my invention may be used with either a liquid fuel feed system, or a vapor fuel feed system, and that the manner in which the pressure on the fuel feed system is initially secured forms no part of my invention which provides means for retaining an increasing pressure as the speed of the engine increases and means for relieving the pressure when the maximum desired speed is reached.

The nature of my improvements will be understood from the above description, and while I have illustrated and described in detail the form in which I prefer to embody my improvements, it will be understood that they may be embodied in other forms without departing from the spirit of my invention. In fact, so far as I am aware, it is broadly new in internal combustion engines to regulate the pressure in a pressure fuel feed system in such manner that the pressure in the fuel feed system is maintained proportional to the speed of the engine, thereby increasing the velocity of fuel feed in such manner as to maintain the quantity of fuel fed constant as the speed of the engine increases; and it is likewise broadly new to add to such a system as that just specified means for relieving the pressure when the speed of the engine rises above a predetermined maximum, thereby automatically regulating the speed of the engine; and it is intended that the claims appended hereto should have a correspondingly broad interpretation.

What I claim is:

1. In a fuel feed system for internal combustion engines, means for maintaining the velocity of fuel feed proportionate to the speed of the engine until the engine has reached a predetermined speed, and means for automatically reducing the velocity of fuel feed when that speed of the engine is reached.

2. In a pressure fuel feed system for internal combustion engines, means for creating pressure in the fuel feed system, and means for retaining a proportionately increased pressure in the system as the speed of the engine increases.

3. In a pressure fuel feed system for internal combustion engines, means for creating pressure in the fuel feed system, means for retaining an increased pressure in the system as the speed of the engine increases, and means for relieving the pressure at a predetermined speed of the engine.

4. In a pressure fuel feed system for internal combustion engines, a fuel pipe, a relief valve therein, means for creating pressure on the fuel in said pipe, means for applying counter-pressure to the relief valve against the pressure of the fuel and means for increasing the counter-pressure as the speed of the engine increases.

5. In a pressure fuel feed system for internal combustion engines, a fuel pipe, a relief valve therein, means for creating pressure on the fuel in said pipe, means for applying counter-pressure to the relief valve against the pressure of the fuel, means for increasing the counter-pressure as the speed of the engine increases, and means for reducing the counter-pressure at a predetermined speed of the engine.

6. In a pressure fuel feed system for internal combustion engines, means for creating pressure in the fuel feed system, means for retaining the pressure in the system, and means for relieving the pressure at a predetermined speed of the engine.

7. In a pressure fuel feed system for internal combustion engines, a fuel pipe, means for creating pressure on the fuel in said pipe, a release valve in the pipe, means for normally holding the release valve closed against the pressure in the pipe, and means for releasing said valve to allow it to open when the engine reaches a pre-determined speed.

8. In a pressure fuel feed system for internal combustion engines, a fuel pipe, a relief valve therein, means for creating pressure on the fuel in the pipe, means for applying counter-pressure to the relief valve and means for reducing the counter-pressure at a predetermined speed of the engine.

9. In a pressure fuel feed system for internal combustion engines, a fuel pipe, a relief valve therein, means for creating pressure on the fuel in the pipe, a governor driven from the engine shaft, and connections between the governor and the valve adapted to hold the valve closed against increased pressure of the fuel, as the speed of the governor increases.

10. In a pressure fuel feed system for internal combustion engines, a fuel pipe, a relief valve therein, means for creating pressure on the fuel in the pipe, a governor driven from the engine shaft and connections between the governor and the valve adapted to actuate the valve to relieve the pressure, when the engine reaches a predetermined speed.

11. In a pressure fuel feed system for internal combustion engines, a fuel pipe, a relief valve therein, means for creating pressure on the fuel in the pipe, a governor driven from the engine shaft and connections between the governor and the valve adapted to hold the valve closed against increased pressure of the fuel up to a predetermined point and then to allow the valve to open and relieve the pressure.

12. In a pressure fuel feed system for internal combustion engines, a fuel pipe, a relief valve therein, means for creating pressure on the fuel in the pipe, a lever connected to the valve, a fulcrum for the lever, means for creating a turning-moment of the lever on its fulcrum against the pressure of the fuel and means for increasing the said turning-moment as the speed of the engine increases.

13. In a pressure fuel feed system for internal combustion engines, a fuel pipe, a relief valve therein, means for creating pressure on the fuel in the pipe, a lever connected to the valve, a fulcrum for the lever, a spring, and adjustable connection between the spring and the lever, through which the spring acts to turn the lever on its fulcrum against the pressure of the fuel and means for adjusting the said connection to increase the leverage of the spring on the lever as the speed of the engine increases.

14. In a pressure fuel feed system for internal combustion engines, a fuel pipe, a relief valve therein, means for creating pressure on the fuel in the pipe, a lever connected to the valve, a fulcrum for the lever, a spring adjustable connections between the spring and the lever through which the spring acts to turn the lever on its fulcrum against the pressure of the fuel, means for adjusting the said connections to increase the leverage of the spring on the lever as the speed of the engine increases, and means for turning the lever against the action of the spring at a predetermined speed of the engine.

15. In a pressure fuel feed system for internal combustion engines, a fuel pipe, a relief valve therein, means for creating pressure on the fuel in the pipe, a lever connected to the valve, a fulcrum for the lever, a pivoted arm, means for turning said arm on its pivot, a link carried by said arm and engaging with the lever to turn it on its pivot against the pressure of the fuel, a governor driven from the engine shaft and a rod connecting the governor and said link, whereby the point of engagement of the link with the lever is varied as the speed of the governor increases.

16. In a pressure fuel feed system for internal combustion engines, a fuel pipe, a relief valve therein, means for creating pressure on the fuel in the pipe, a lever connected to the valve, a fulcrum for the lever, a pivoted arm, means for turning said arm on its pivot, a link carried by said arm and engaging with the lever to turn it on its fulcrum against the pressure of the fuel, a governor driven from the engine shaft, a rod connecting the governor and said link, whereby as the speed of the governor increases the point of engagement of the link with the lever is varied, a stop on said rod, and a projection on said lever in the path of movement of the stop, whereby at a predetermined speed of the governor the lever is rotated against the action of the link; substantially as described.

17. In a pressure fuel feed system for internal combustion engines, a fuel pipe, a weighted relief valve therein, means for creating pressure on the fuel in the pipe, a lever pressing on said valve, a slot in said lever, a pivoted arm, a spring for turning said arm on its pin, a link carried by said arm, a pin on said link engaging the slot in the lever, a governor, a rod connected to the governor, a head carried by the rod and engaging said link, a stop on said head and a projection on the said lever in the path of movement of the stop, substantially as described.

In testimony whereof I affix my signature, in presence of two witnesses.

FRANCIS W. BRADY.

Witnesses:
BURGESS OCRUDEN,
WILLIAM H. DAVIS.